3,430,727
SEISMIC SIGNAL TRANSDUCING APPARATUS
Booth B. Strange and Ben B. Thigpen, Houston, Tex., assignors to Western Geophysical Company of America, Los Angeles, Calif., a corporation of Delaware
Filed Apr. 21, 1967, Ser. No. 632,741
U.S. Cl. 181—.5          8 Claims
Int. Cl. G01v 1/00

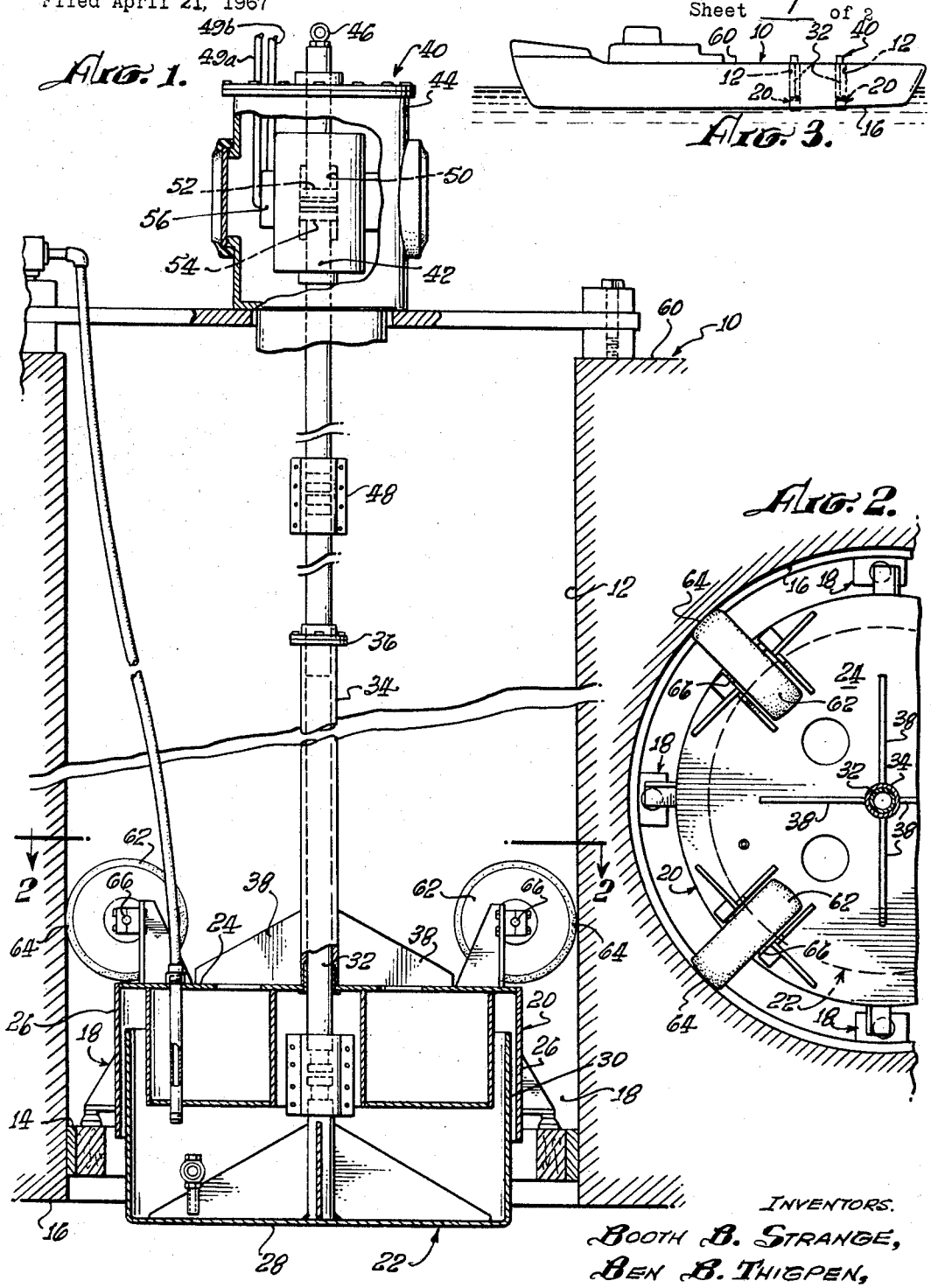

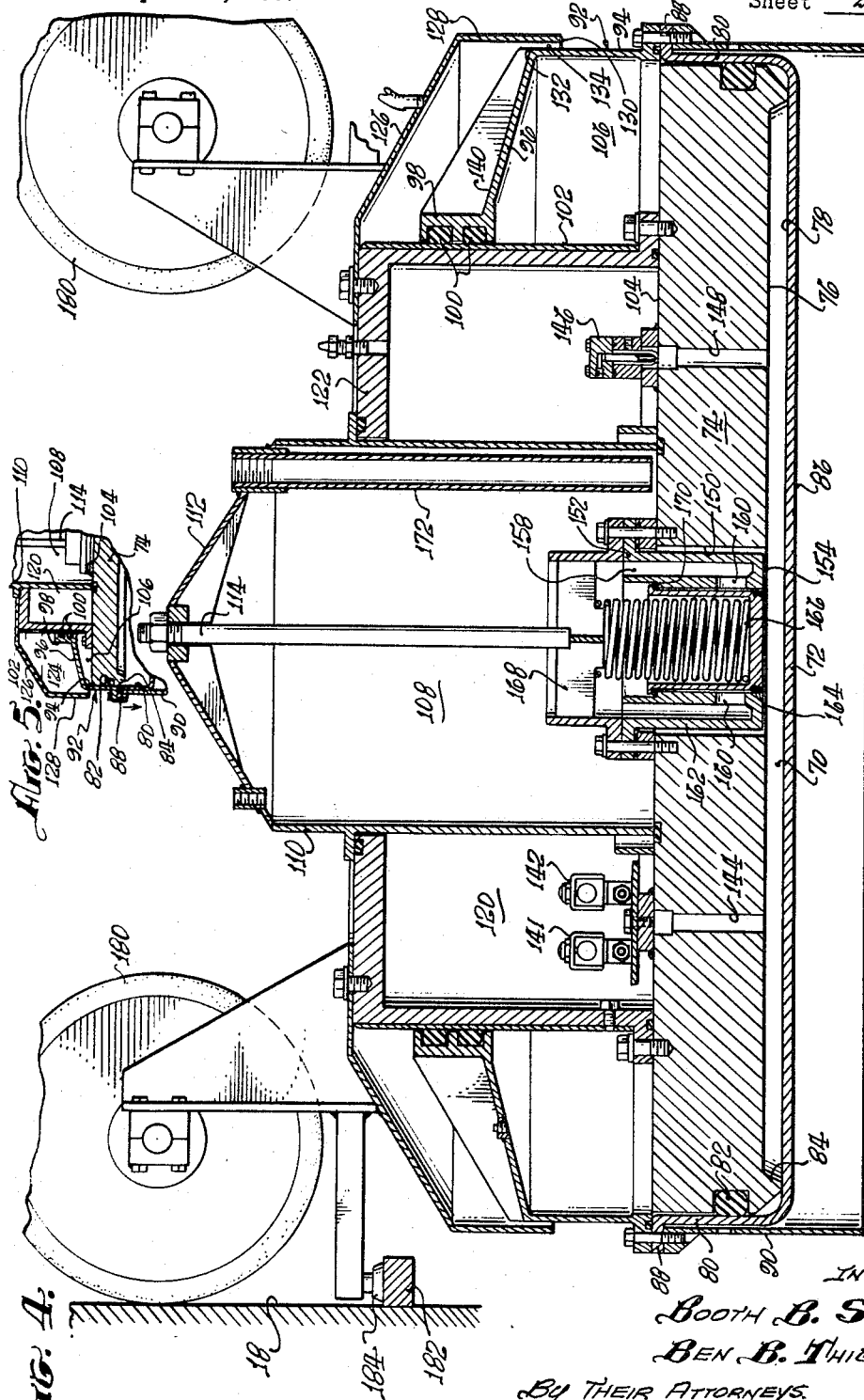

ABSTRACT OF THE DISCLOSURE

A marine seismic signal generator having at least two telescopically mated surfaces, one surface being free to reciprocally move relative to the other surface and including a generating surface exposed to a body of water. A source of air supplies air pressure to the cavity formed between the mated surfaces to preclude water from entering into the cavity. An energy source imparts motion to the generating surface to produce the desired impulses into the body of water.

This invention relates to signal transducers and more particularly to a signal transducing apparatus for use in marine seismic surveying.

The reflection method of seismic surveying by which information concerning earth formations is obtained by transmitting vibrations from a first point at or near the surface of the earth downwardly into the formation and measuring the reflected or refracted vibrations at one or more second points spaced along the earth's surface from the first point is, of course, well known. The most common means for generating such vibrations has been by the explosion of a shot at or near the earth's surface. In the recent past, the seismic surveying of geologic formations underlying bodies of water has become increasingly important. Additionally, various methods for generating vibrations other than by explosion have also been developed and made a practicality. Such methods include those as described in U.S. Patent No. 3,124,781 to Loper et al., issued Mar. 10, 1964, by which the vibratory signals to be reflected and detected are generated by the repetitive production of small signals, as by the repetitive impact of a weight on the earth's surface, rather than by the single generation of an explosion. Another method of generating signals to be reflected for seismographic exploration is described in U.S. Patent No. 2,688,124 issued 1954 to Doty et al. By this method a vibratory signal of more than one cycle is transmitted for a period of time longer than the duration of the input signal produced by a conventional seismic explosion or single impact signal. The signal of more than one cycle has a changing frequency pattern from the start of the signal to the end of the signal. By this means, energy is transmitted by a continuous or semicontinuous process over a period of time and is then analyzed. Such an energy transmission of substantial duration is more effective than the energy generated during a few microseconds such as by an explosion or a single impact even though the energy wave of the explosion may be many times greater in magnitude than the signal produced for exploration by the continuous method.

Customarily, marine seismographic prospecting is conducted by using at least one ship which tows a hydrophone cable to which are attached a plurality of hydrophones at spaced intervals along the cable. In the most common operation, the ship proceeds along a predetermined course until it reaches a location at which data is to be taken. The ship then disengages its engines allowing the ship and cable to drift. An explosive charge is then detonated several hundred feet to one side of the center of the hydrophone cable. This charge may be released from the first vessel by means of a cable or may be dropped by a second vessel traveling a parallel course with the first one. Sound waves produced by the detonation of the explosive travels through the water and into the geologic formation beneath. The sound waves are reflected from various interfaces in the geologic section and returned through the water to the hydrophones. The hydrophones convert the sound waves into electrical impulses which are transmitted down the cable to the recording vessel where they are recorded in several modes well known to the art. There have, however, been developed in the recent past, streamer-marine hydrophone cables that can record while being moved through the water. Such hydrophones are described in U.S. Patent No. 2,465,696 issued in 1949 to Paslay. By means of such devices which are responsive to variations and pressures set up within the surrounding water by the seismic signals without contact of the detectors with the earth's surface beneath the water, it is possible to detect and record the seismic signals while the vessel containing the seismic recording equipment is proceeding along a predetermined course. For marine exploration the only method of producing the seismic signal other than by means of an explosion has been by means of a powerful single sound impulse.

The present invention provides an improved means for generating the seismic input signal. A repetitive signal is produced which may be of uniform magnitude and may be varied in frequency, as by producing a swept frequency signal, such that the method of surveying as described in U.S. Patent No. 2,688,124 (supra) which can be employed and adapted to seismic exploration under bodies of water. Alternatively single impulses may be produced by apparatus such as that shown in U.S. Patent No. 3,260,327.

In a first embodiment, the apparatus of the present invention comprises a cyclical marine seismic signal generator having an oscillatory member exposed on the outer surface thereof to the water body. The oscillatory member is telescopically mateable with a stationary member such that a cavity is defined between the members. Air under pressure is maintained in the cavity whereby water is kept from the cavity and inner surface of the oscillatory member by the air-water interface. The oscillatory member is connected to a means for generating oscillatory movement of predetermined frequency and magnitude. Signals generated by the oscillatory generators are transmitted by the oscillatory member to the water as an acoustic signal.

In an alternative embodiment of the present invention an improved construction of a single impulse marine seismic signal generator is provided. Such improved construction again includes the feature that air under pressure is maintained in a cavity above the movable signal generating member to keep water from such cavity and thus from one side of the movable member.

The novel features which are believed to be characteristic of the invention, both as to its organization and method of operation, together with further objects and advantages thereof will be better understood from the following description considered in connection with the accompanying drawings in which a presently preferred embodiment of the invention is illustrated by way of example. It is to be expressly understood, however, that the drawing is for the purpose of illustration and description only, and is not intended as a definition of the limits of the invention.

In the drawing:

FIGURE 1 is a cross-sectional view in elevation of an illustrative first embodiment of the present invention for generating a repetitive signal;

FIGURE 2 is a sectional view taken along line 2—2 of FIGURE 1;

FIGURE 3 is a schematic view of the apparatus of the present invention in combination with a vessel;

FIGURE 4 is a sectional view of an alternative embodiment of the present invention for generating a single impulse signal; and, FIGURE 5 is a partial view of the apparatus of FIGURE 4.

Although the present invention is described hereinafter in connection with seismic surveying by the reflection method it is to be understood that the apparatus of the present invention is equally applicable to the generation of acoustic or seismic signals for other purposes.

Referring now to the figures and particularly to FIGURES 1 and 2 there is shown in sectional elevation an illustrative embodiment of the present invention in the form of an apparatus for generating cyclic signals as installed for use in a seismic vessel. The hull, only a portion of which is shown in FIGURE 1 is designated as 10 and shown schematically in FIGURE 3. In its presently preferred embodiment the apparatus of the present invention is used in combination with a vessel by forming a well 12 through the vessel and extending the apparatus through the well into contact with the water body while the watertight integrity of the vessel is maintained independent of the apparatus. Thus, as shown schematically in FIGURE 3 two wells are formed in the illustrative vessel by cylindrical walls extending vertically from the working deck 60 to the hull beneath the waterline of the vessel. The apparatus of the present invention is mounted upon an annular flange 14, or by other suitable means, such that the lower surface of the signal generating apparatus is approximately coincident with the lower surface 16 of the hull or at a predetermined depth beneath such hull line. In order to isolate the signal generating apparatus from the vessel the apparatus is preferably mounted upon the annular flange 14 by shock and vibration mounts 18 of the type well known to the art. The shock mounts are in turn affixed to a stationary portion of the apparatus such as the stationary cavity forming member 20 which is telescopically mateable with the oscillating member 22.

In the illustrative embodiment of the present invention, as shown in FIGURES 1, 2 and 3, the stationary member 20 includes an upper surface 24 with a vertically downwardly extending annular flange 26. The oscillating member 22 in turn has a horizontal lower surface which is the signal generating surface 28 and an upwardly extending annular flange 30 having an outside diameter substantially equal to or slightly less than the inside diameter of the outer flange 26, the difference in diameters being such as to allow free reciprocal telescopic movement between the stationary female member 20 and the oscillating male member 22. The members 20 and 22 when mated define a cavity of substantial volume therebetween.

A connecting rod 32 is affixed to the oscillating member 22 and extends vertically upward to the level of the working deck where it is connected to a means for generating the oscillating motion as described more fully hereinafter. The connecting rod extends through the upper surface 24 of the stationary member 20 substantially at the centerpoint thereof.

In order to provide suitable bearing and guide means to insure vertical reciprocation of the oscillating member and to provide air tight integrity to the cavity a bearing sleeve 34 is affixed to the upper surface of the stationary member 20 and surrounds the connecting rod through an appreciable portion of its length. At the upper end 36 of the bearing sleeve 34 where the connecting rod emerges therefrom an air seal is provided about the connecting rod to maintain air pressure within the cavity as discussed more fully hereinafter. The lower end of the connecting rod is affixed to the oscillating member by welding and reinforcing gussets as shown at 38 or by other suitable means.

At a convenient level there is positioned a means for inducing the required reciprocating motion to the connecting rod 32. In the illustrative embodiment a servo-controlled oscillation generator of the type well known to the art is employed. The oscillation generator is designated generally as 40 and is shown partially schematically. In the embodiment shown it is of the type which includes an oscillating piston 42 which extends through the upper end of the housing 44 where it terminates in an attaching means 46 for removing the assembly from the well. The piston extends through the lower end of the housing 44 and is connected to the connecting rod 32 at a shaft coupling 48. Fluid lines are indicated at 49a and 49b extending to a cylinder 50 defined around the piston whereby fluid under pressure admitted to the cylinder at one piston face 52 will cause movement of the piston in one direction while fluid under pressure admitted at the opposite piston face 54 causes movement in the opposite direction. The flow of fluid is regulated by the servo-valve 56 to oscillate the piston at the desired cyclical rate and amplitude which rate and amplitude are directly transmitted through the connecting rod 32 to the oscillating member 22.

In the embodiment shown the stationary member 20 is shock isolated from the vessel while the oscillation generator is affixed to the working deck 60 of the vessel. It can be seen that other mounting arrangements can be employed, e.g., that the oscillation generator can be similarly isolation mounted and the oscillating members can be freely suspended within the well to the required depth.

In order to facilitate installation and removal of the apparatus of the present invention within the well of the vessel and to retain the positioning and alignment of the equipment, guide means in bearing contact with the sides of the well are employed. In the illustrative embodiment four bearing members 62 are rotatably mounted upon the stationary member 20 with bearing surfaces 64 positioned at the radius of the well. In the embodiment shown four tires are rotatably mounted upon axles 66 which are in turn affixed to the upper surface of the stationary member 20. From the foregoing it can be seen that the entire signal generating assembly including the oscillation generator and signal generation assembly, such assembly being designated as the combination of components below the shaft coupling, can be removed as a unit or that the oscillation generator can be detached at the shaft coupling 48 and separately removed.

Referring now particularly to FIGURE 1, as discussed hereinbefore, the stationary member 20 and oscillating member 22 define therebetween a substantial cavity which increases and decreases in volume as the oscillating member 22 reciprocates telescopically within the stationary member. Since such telescopic movement cannot freely occur if the mating flanges 26 and 30 are not spaced one from the other water will flow into the cavity if such entry is not prevented. The water pressure at the flange opening is from 8 to 12 feet of water dependent upon the head of water in the well, i.e., the position of the water line of the vessel. In accordance with the present invention the cavity is maintained free of water by the creation of an air-water interface between the flanges 26 and 30. Such an air-water interface is created by maintaining air in the cavity at a pressure substantially equal to the water pressure at the flanges.

From the foregoing it may be seen that the present invention provides means for transmitting energy to the body of water in a controlled manner, which energy is transformed into energy waves which progress from the source of generation, i.e., the oscillating surface 28 and are reflected from subsurface formations as seismic signals. The energy transmitted to the body of water by means of the present invention is directly proportional to and a function of the area of the oscillating surface 28 and the square of the amplitude of surface travel. It has also been found, in connection with the present invention, that in order to effectively couple the energy of the oscillator in a cyclical manner to the body of water, direct coupling of the oscillator to the water, without the occurrence of cavitation is essential. Thus, to further illustrate the present invention, in the presently preferred embodiment the lower surface 28 of the oscillating member is approximately 5 feet in diameter. Its location is approximately 8 to 12 feet below water level such that a constant pressure approximately equal to a 8 to 12 foot head of water is exerted upon the lower surface of the apparatus. The frequency employed in a typical seismic survey utilizing the present invention is from 5 to 60 cycles per second and the amplitude of the travel of the oscillating member outwardly from the balanced position is predetermined to be less than two inches. The area of the oscillating surface 28, the amplitude of travel, and the frequency at which the oscillating member is cycled, are interrelated and predetermined to maximize the energy transmitted to the body of water while obviating cavitation. Cavitation must be avoided at the outer side of the oscillating surface since such cavitation would result in loss of energy transmission through the water body. Generally speaking, the parameters of frequency and amplitude of travel of the oscillating surface must be predetermined such that the water at the exterior of the oscillating surface can follow the motion of the surface without decreasing the hydrostatic pressure below the vapor pressure of the water. Within the frequency ranges discussed above it has been found that a maximum amplitude of two inches allows satisfactory operation without cavitation or disturbing turbulence on the water side of the oscillating member.

Referring now to FIGURES 4 and 5 there is shown an alternative embodiment of the present invention for providing an improved single impulse seismic signal generator of the general type known as Dinoseis generators and shown in U.S. Patents Nos. 3,235,027 and 3,260,327. Such apparatus is employed where a generator of short wave signals and short overall duration of reflected events is desired. Such seismic signal generators generally include a traveling member or plate which again serves as the signal generating member. In this apparatus a single impact is delivered to the member, to induce the required travel, by detonation of an explosive charge. Such charge is most generally a mixture of gases such as propane and oxygen. The charge is detonated in a firing chamber between the inner surface of the generating plate and a reaction mass, such as an inertia plate of high mass spaced a predetermined distance from the movable plate. Means are provided for quickly venting the detonated gases and supplying a fresh explosive charge to the firing chamber. The apparatus of FIGURES 3 and 4 provides an improved apparatus of this general type.

As shown in FIGURE 4 a firing chamber 70 is defined between a generating plate 72, hereinafter termed the movable plate, and an inertia mass in the form of a thick plate 74, hereinafter termed the mass plate 74, having a lower face 76 parallel to and spaced from the upper face 78 of the movable plate 72. The movable plate 72 has an upturned flange 80 surrounding the perimeter of the mass plate 74 in close proximity thereto with an O-ring seal 82 between the perimeter surface of the mass plate 74 and the flange 80. A depending annular lip 84 extending from the lower face of the mass plate 74 spaces the movable plate from the mass plate to thereby define the depth and perimeter of the firing chamber 70. The movable plate thus defines a generating outer surface 86 in contact with the water body. At the upper end of the annular flange 80 there is provided an outturned flange 88 to which a depending skirt 90 is affixed. The vertical distance by which the skirt 90 extends downwardly beyond the radiating or generating surface 86 of the movable plate thereby confines and directs the signal generated by the plate. There is also attached to the flange 88 an upwardly extending housing member 92 which includes a vertical wall 94 having a diameter and wall thickness approximately equal to that of the movable-plate flange 80. The vertical wall extends upwardly a predetermined distance and terminates in an inwardly extending wall 96. The inwardly extending wall in turn terminates at a substantially lesser diameter than the diameter of the vertical wall 94 and terminates in an upwardly extending annular member 98 into which O-ring seals 100 are inserted. The O-ring seals are in sliding contact with a vertical cylindrical wall 102 which is in turn affixed to the upper surface 104 of the mass plate 74. There is thus defined between the movable plate housing member 92 and the vertical wall 102, together with the upper surface portion of the mass plate, a closed annular chamber 106. As will be described more fully hereinafter, the movable plate 72 together with its upturned flange 80, the depending skirt 90 and the movable plate housing member 92 define the movable sub-assembly of the generating apparatus of the present invention and all of such members move with respect to the stationary portions of the apparatus affixed to the mass plate 74.

An exhaust chamber 108 is defined by a cylindrical housing 110 affixed to the upper surface 104 of the mass plate 74. The exhaust housing is again cylindrical in configuration and is closed by an upper wall 112 through which a threaded assembly member 114 extends. A nut 116 is threaded upon the member 114 to hold the exhaust chamber housing in compression against the upper surface 104 of the mass plate 74. A third or intermediate annular chamber 120 is thus defined by the outer wall of the exhaust chamber housing and the vertical wall 102 which are substantially radially spaced apart. The chamber 120 is closed at its upper end by annular wall 122 through which various gas connections are made as described hereinafter.

Accordingly, the construction of the present invention defines a central exhaust chamber 108, an intermediate annular chamber 120, and a third annular chamber 106. Each of the chambers are substantially symmetrical with respect to the centerline of the apparatus. A fourth annular chamber 124 is defined at the same radius as the chamber 106 and positioned above it. This chamber 124 is defined by an upper wall 126 which extends radially outwardly from the vertical wall 122 of the stationary housing. At a diameter approximately equal to, but greater than, the diameter of the outer face of the vertical wall 94 there is provided a depending vertical wall 128 which defines the outer diameter of the chamber 124. The annular outer wall 128 depends a substantial distance such that the lower edge 130 thereof overlaps by a substantial distance the upper edge 132 of the upwardly extending vertical wall 94 of the movable housing 92. A space, designated as 134, is thereby defined between the depending wall 128 and the movable housing wall 94. From the foregoing it can be seen that the movable sub-assembly 92 including the walls of the movable housing 94 and 96 are movable with respect to the vertical wall 102 affixed to the top surface of the mass plate 74 and the walls 126 and 128 defining the annular chamber 124. It can also be seen that the lower surface of the movable sub-assembly in contact with the water when the apparatus is submerged is the generating or radiating surface 86 and the upper surface of the movable sub-assembly which would be exposed to water would be the upper surface 140 of the wall 96. It can be seen further that the annular chamber 106 filled with air, will entrap such air and provide an air spring which will tend to move the wall 96 away from the surface 104 of the mass plate when the movable housing is driven downwardly by an explosion as described hereinafter. A fitting is provided through the upper wall 126 leading into the annular chamber 124. Air under pressure, which pressure is greater than the pressure of the water at the depth of the space 134, between the walls 128 and 94 is supplied through the fitting 135 to the chamber 124. The air under pressure will then prevent the entry of water into the annular space 124 and will create an air-water interface, designated as 136, in the space 134. The entry of water into the annular space 124 is prevented and its preclusion from the upper surface 140 of the movable sub-assembly 92 of the apparatus is thus provided.

Within the annular chamber 120 there is provided a pair of gas mixing valves 141 and 142 which through suitable connections allow the entry of oxygen and gas, such as propane, into the firing chamber through the mixture inlet line 144 extending through the mass plate 74 in communication with the firing chamber 70. The valves 141 and 142 are of the type well known to the art as are the connections for supplying gas at the appropriate pressure to such valve and accordingly, such connections are not shown in detail, it being sufficient to note that appropriate gas lines would extend from such valves through the housing defining the annular chamber up into the working space of the vessel upon which the apparatus is mounted. Similarly, an ignitor 146, which is typically a spark plug having appropriate electrical connections, is provided in the annular chamber 120 with the spark plug 146 in communication with an ignition path 148 extending from the spark plug through the mass plate 74 in communication with the firing chamber 70. Electrical connections and timers to the spark plug would also be conventional and well known to the art and are not shown in detail.

Approximately symmetrically about the centerline of the apparatus there is defined through the mass plate 74 a large opening defined by the wall 150 into which opening an exhaust mechanism is provided. In the presently preferred embodiment the exhaust sub-assembly includes a cylinder 152 mounted upon the top surface 104 of the mass plate and extending through the opening 150 in the mass plate to the point at which its lower surface 154 is substantially coincident with the lower surface 76 of the mass plate. The exhaust cylinder 152 defines an exhaust port 158 which is longitudinal with respect to the cylinder and has transverse exhaust openings 160 through the interior cylinder wall defined near the lower end of the cylinder 154. A spring loaded piston 162 is positioned within the cylinder wall and is movable with respect thereto. Suitable seals such as 164 are provided between the cylinder wall and the piston wall. A spring 166 is positioned within the piston and is in compression between the lower piston wall and a spider 168 such that it is urged to its downward position at which position it is retained by a shoulder 170. When an explosion takes place the pressure in the firing chamber urges the piston 162 upwardly against the spring compression until the seals 164 pass the exhaust port 160 at which time the gases are vented from the firing chamber through the port 160 and 158 upwardly through the spider into the exhaust chamber 108. They are then conducted from the exhaust chamber through a suitable exhaust pipe 172 which extends through the housing wall 112 and up an appropriate gas exhaust line not shown.

The apparatus of the alternative embodiment of FIGURES 3 and 4 is mounted within the well of the vessel as previously described in connection with the first embodiment of FIGURES 1 and 2. The guide means such as rubber tires 180 are again affixed to the upper surface of the apparatus and the apparatus may be retained by any suitable means such as by affixing a flange to a part of the stationary housing of the apparatus and allowing such flange to rest upon a properly positioned inwardly extending annular flange 182 in the well of the vessel preferably with shock mounts 184 therebetween.

Thus, briefly, in operation referring to FIGURES 4 and 5 the apparatus of the present invention provides for the introduction of an explosive mixture through suitable valves 141 and 142 to the firing chamber 70 between the mass plate 74 and the movable generating plate 72. The gas is ignited by means such as spark from the spark plug 146. The explosion generates a single impulse through the body of water at the opposite or generating face 86 of the movable body 72 after which the exhaust piston 162 moves upwardly to exhaust the gas from the firing chamber through the exhaust chamber 108. When the explosion occurs the entire movable sub-assembly designated generally as 92 moves to a downward position as shown in FIGURE 5. Water is prevented from entering the annular chamber 124 above the upper face of the movable sub-assembly by the presence of air under pressure in the chamber 124 which pressure is equal to the water pressure at the depth of the space 134 between the stationary wall 128 and the movable wall 94. Compression of the air in the annular chamber 106 will cause the wall 96 and thus the movable sub-assembly 92 to be moved upwardly to the position shown in FIGURE 4 when the detonated gases have been exhausted from the firing chamber 70.

From the foregoing it can be seen that the present invention provides improved apparatus for the generation of either cyclic or single impulse marine seismic signals. An important aspect of such apparatus is the preclusion of water from the side of the traveling member for generating the seismic signal without the necessity of seals interposed between such traveling member and the stationary member.

What is claimed is:

1. A marine seismic signal generating apparatus comprising:
   a first stationary unit affixed to a floating platform and submerged in a body of water;
   a second movable unit telescopically mated with said first unit, said second unit being free to reciprocally move relative to said first unit, and said second unit including an outer generating surface exposed to said body of water;
   said first and second units having mated non-abutting surfaces defining a cavity therebetween;
   means for supplying air under pressure to said cavity to preclude water from said cavity; and
   means for imparting movement to said movable unit to generate said signal.

2. Apparatus of claim 1 in which said first and second units include annular transverse flanges telescopically and non-abuttingly mated, said air under pressure providing an air-water interface between said flanges.

3. The apparatus as defined in claim 1, wherein said means for imparting movement to said movable unit is a single impulse mechanism.

4. The apparatus as defined in claim 1 wherein said means for imparting movement to said movable unit is a cyclical movement generator.

5. A marine seismic signal generating apparatus comprising:
   a floating vessel;
   a well extending through the hull of the vessel from the lower side of the hull upwardly to a working deck above the waterline;
   a first stationary unit affixed to said vessel within said well and submerged in a body of water;
   a second movable unit telescopically mated with said first unit, said second unit being free to reciprocally move relative to said first unit, and said second unit including an outer generating surface exposed to said body of water;
   said first and second units having mated non-abutting surfaces defining a cavity therebetween;
   means for supplying air under pressure to said cavity to preclude water from said cavity; and, means for imparting movement to said movable unit to generate said signal.

6. Apparatus of claim 5 in which said first and second units include annular transverse flanges telescopically and non-abuttingly mated, said air under pressure providing an air-water interface between said flanges.

7. The apparatus as defined in claim 5 wherein said means for imparting movement to said movable unit is a single impulse mechanism.

8. The apparatus as defined in claim 5 wherein said means for imparting movement to said movable unit is a cyclical movement generator.

References Cited

UNITED STATES PATENTS

| 3,064,753 | 11/1962 | McClure | 181—.5 |
| 3,249,177 | 5/1966 | Chelminski | 181—.5 |
| 3,260,327 | 7/1966 | McCollum | 181—.5 |
| 3,329,930 | 7/1967 | Cole et al. | 181—.5 |

FOREIGN PATENTS 608,169  11/1960  Canada.

BENJAMIN A. BORCHELT, *Primary Examiner.*

GERALD H. GLANZMAN, *Assistant Examiner.*